Sept. 14, 1965           C. W. FINKL           3,206,302

METHOD FOR DEGASSING MOLTEN METAL UNDER HIGH VACUUM

Filed May 29, 1961           3 Sheets-Sheet 1

INVENTOR.
Charles W. Finkl,
BY Parker & Carter
Attorneys.

Sept. 14, 1965 C. W. FINKL 3,206,302
METHOD FOR DEGASSING MOLTEN METAL UNDER HIGH VACUUM
Filed May 29, 1961 3 Sheets-Sheet 2

INVENTOR.
Charles W. Finkl,
BY Parker & Carter
Attorneys.

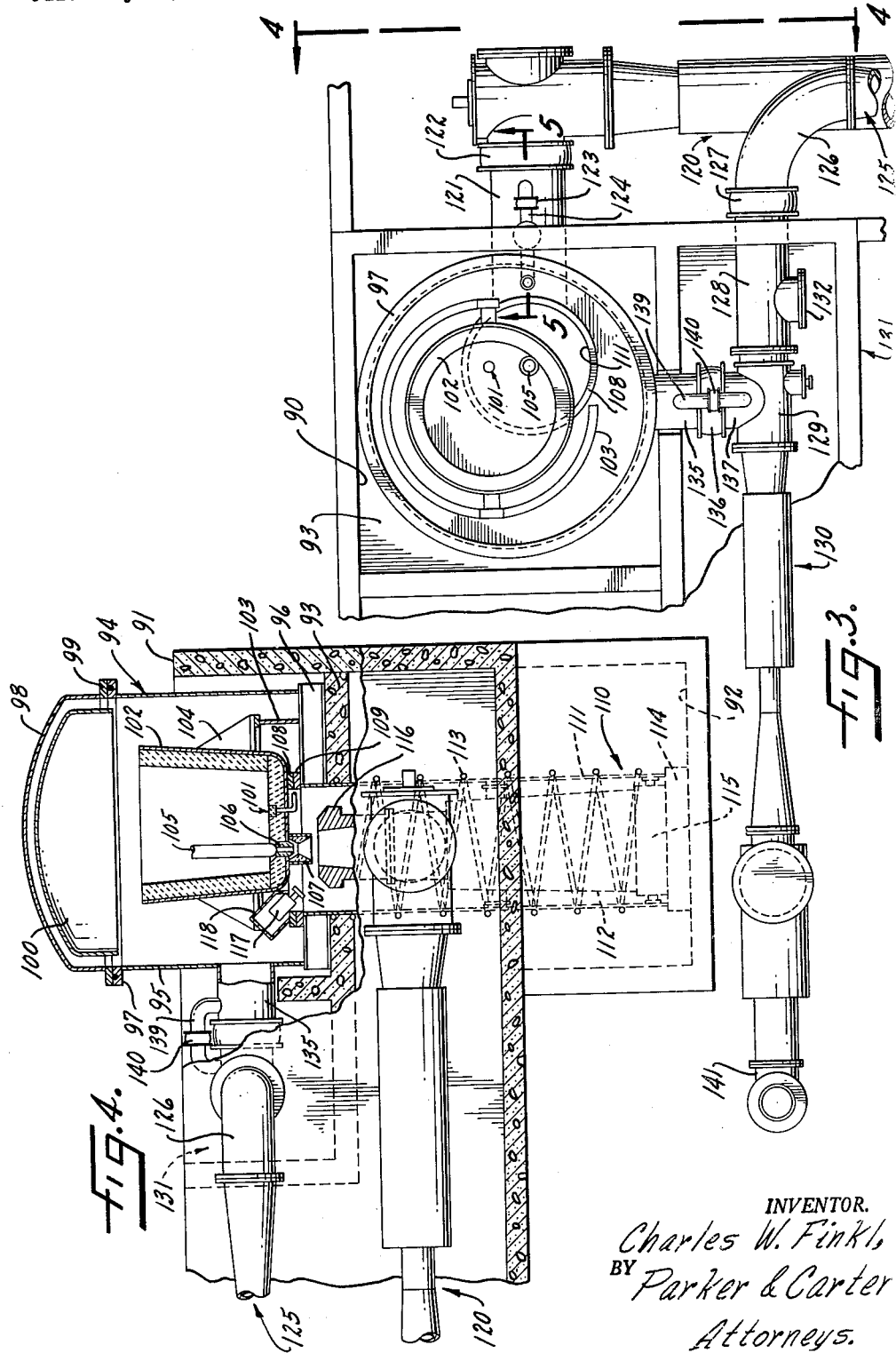

3,206,302
Patented Sept. 14, 1965

3,206,302
METHOD FOR DEGASSING MOLTEN METAL UNDER HIGH VACUUM
Charles W. Finkl, Chicago, Ill., assignor to A. Finkl & Sons Co., Chicago, Ill., a corporation of Illinois
Filed May 29, 1961, Ser. No. 113,419
1 Claim. (Cl. 75—49)

This is a continuation-in-part of my copending application Serial No. 777,664, filed December 2, 1958.

My invention relates to degassing molten metal, and particularly to apparatus and methods for producing substantially vacuum arc remelt quality steel without remelting the steel or adding external heat.

The degassing of molten metal, particularly steel, is increasing as industry demands higher and high quality steel. Various methods of degassing molten metal in commercial size batches have been developed to meet this demand. An early method involved merely subjecting the surface of a ladle of molten metal to a vacuum. A simple and effective method is illustrated in my copending application, Serial No. 777,664, filed December 2, 1958, of which this application is a continuation-in-part. My application describes, among other things, the subjection of a ladle of molten metal to a very low vacuum, said vacuum being sufficiently low to degas, and simultaneously bubbling an inert purging gas upwardly through it. Other examples of methods of degassing molten metal are illustrated in United States Patent 2,906,521, British Patent 741,567, United States Patent 1,021,060 and United States Patent 2,253,421.

The method described in my above mentioned application has produced steel having an included gas content of 1.2 p.p.m. $H_2$, 22 p.p.m. $N_2$ and 19 p.p.m. $O_2$ in a single commercial sized heat of around 35 tons. Included gas contents, in different heats, as low as 1.0 p.p.m. $H_2$, 4 p.p.m. $N_2$ and 10 p.p.m. $O_2$ have been obtained. The average is somewhat above these latter values, however.

None of the above described methods, however, is quite capable of producing vacuum arc remelt quality steel. Vacuum arc remelt applications demand a very high quality steel because of the high strength-to-weight ratio required and the relatively small amount of dead weight that can be tolerated in contrast to the vast majority of other applications. To date, to my knowledge, the only process capable of producing vacuum arc remelt quality steel on a commercial sized basis—that is in batches of several tons or more— is the consumable electrode melting process, wherein a high quality steel electrode is remelted, with an arc in high vacuum, and recast.

In this process a consumable electrode is made up having a diameter 4 to 5 inches smaller than the end product desired, usually an ingot. The electrode is made of the same material as the eventual ingot except that it contains too many impurities, and may be enriched in certain alloying elements that are incompletely recovered in arc melting. The phrase "too many impurities" is relative because electrode material may actually be a very good quality steel.

The electrode is connected to a source of current. An arc is then struck between the bottom of the electrode and a stub in the mold which is to form the ingot. As the consumable electrode melts, a puddle of molten metal is formed. Since the puddle, due to its greater area, rises slower than the lower tip of the electrode melts away, the electrode is advanced downwardly toward the rising puddle by a suitable mechanism. The melting is always carried out in a very high vacuum so that the included deleterious gases or their reaction products escape from the system.

Although the above described process is satisfactory for producing vacuum arc remelt quality steel, it is a lengthy process and, correspondingly, an expensive one due to the time required, electric current consumed, and special equipment needed.

The method and apparatus disclosed in this application are particularly advantageous in producing a cleaner steel suitable for aircraft and missile application. Lowering the oxygen content requires that the steel be subjected to very low vacuums, even lower than those used in removing hydrogen. To my knowledge, it has heretofore not been possible to remove sufficient oxygen without remelting the steel and in the absence of external heat.

Experience has shown that a steam ejector system is a good vacuum system for lowering the oxygen content of the steel. However, in order to pull a vacuum on the order of a few microns of Hg, say around 10 or less, a tremendously long degassing time is needed or an enormously large ejector system is required because the capacity of the ejector system, that is the pounds per hour of equivalent air it can remove, is inversely proportional to the vacuum created by it. To illustrate, reference is made to the following table, which shows the capacity of typical four, five and six stage steam ejector vacuum systems.

TABLE I

| System | Pounds of Equivalent Air Per Hour | Absolute Pressure in Microns Hg |
|---|---|---|
| 4 Stage | 500 | 2,000 |
| 4 Stage | 300 | 1,000 |
| 4 Stage | 215 | 500 |
| 5 Stage | 55 | 100 |
| 5 Stage | 30 | 50 |
| 6 Stage | 4.25 | 10 |
| 6 Stage | 2.50 | 5 |

The reason for the reduced capacity of a steam ejector system as the number of stages increases essentially is that once a condition is reached in an ejector system when it is no longer possible to condense the steam between stages, each succeeding stage has to handle not only the noncondensable gas load, but the steam load as well. With a three stage steam ejector system, each stage can be condensing. With a four stage ejector system, the first stage would be noncondensing. For example, assume that cooling water is available at a temperature of not lower than 50 degrees F. A steam ejector discharging into a condenser having 50 degree water would have a discharge pressure of about 9⅕ millimeters, or approximately 9,204 microns. This ejector would then have a suction pressure of around 150 to 300 microns. Any pressure below 150 to 300 microns would require another stage and, of course, any additional stages must run noncondensing due to the cooling water limitations. The additional stages must, of course, discharge into the following stage so that the following stage must handle both the gas load and the steam load. As a result, the capacity of a five or six stage steam ejector system is quite reduced as contrasted to a four stage system.

This system limitation is overcome with my invention by removing the bulk of the deleterious gases in a large capacity, relatively high vacuum system and then completing degassing in a low capacity, relatively low vacuum system. As mentioned, the very low vacuums, on the order of 5 to 10 microns, appear to be necessary in order to effectively remove oxygen from the steel.

Accordingly, a primary object of this invention is to provide a method and apparatus for making substantially vacuum arc remelt quality steel without double melting or remelting of the steel. It is further desired to produce substantially vacuum arc remelt quality steel in commercial size quantities such as blooms on the order of 24 inches square, or even larger.

Another object is to provide a method and apparatus for producing a solid ingot of vacuum arc remelt quality steel by building up the ingot at a uniform rate so as to take advantage of the optimum freezing pattern.

Another object is to provide a method and apparatus for removing more oxygen and nitrogen than can be removed by present degassing methods with attendant advantages including reduction of inclusions which in turn results in a cleaner steel, substantially conformable to vacuum arc remelt quality standards.

Another object is to provide a method and apparatus for making substantially vacuum arc remelt quality steel without remelting or the addition of external heat which utilizes existing equipment, in part, so that an installation is relatively inexpensive to install and operate.

A further object is to provide a method and apparatus for producing substantially vacuum arc remelt quality steel which requires minimum superheating of the steel and can be carried out within the permissible temperature drop limitation of the steel without the addition of heat to the process, thus eliminating special heating equipment and its attendant complications.

Another object is to provide a method and apparatus for producing vacuum arc remelt quality steel which prevents contamination during teeming.

Other objects and advantages of the invention will become apparent upon a reading of the following description of the invention.

The invention is illustrated more or less diagrammatically in the accompanying drawings, wherein:

FIGURE 3 is a top plan view similar to FIGURE 1 of another embodiment of the invention illustrating physically contiguous ladle degassing and ingot teeming vacuum chambers;

FIGURE 4 is a view taken substantially along the line 4—4 of FIGURE 3, with parts in section and parts broken away.

Like reference numerals will be used to refer to like parts throughout the following description of the drawings.

Figure 1:
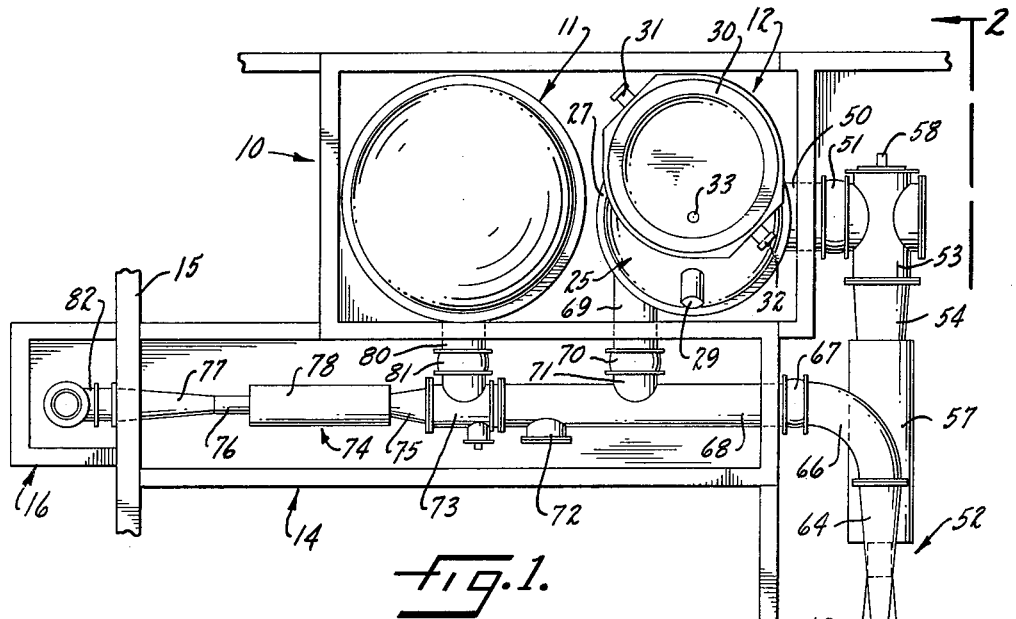
FIGURE 1 is a top plan view of one embodiment of the invention illustrating physically separate ladle degassing and ingot teeming vacuum tanks.
Figure 2:
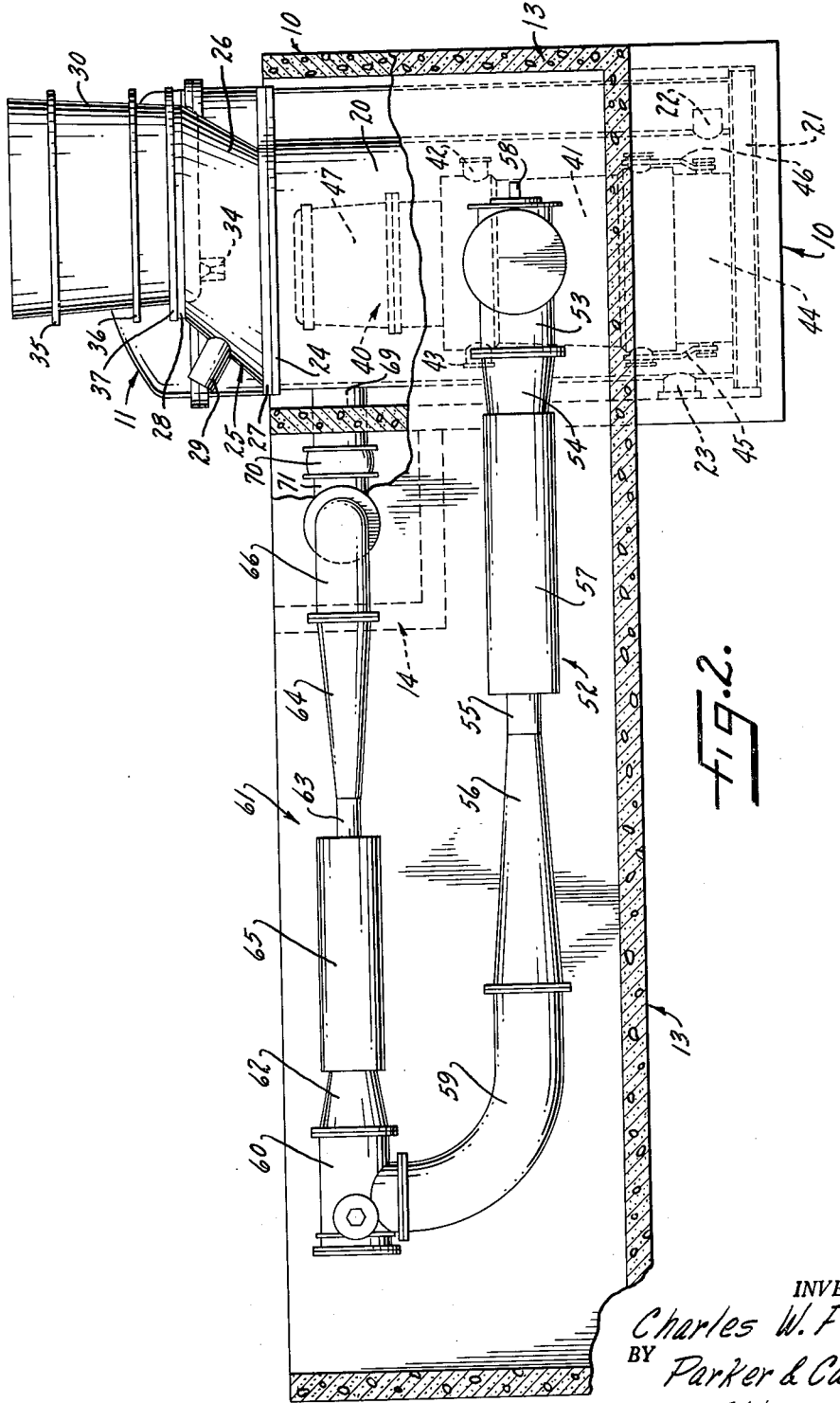
FIGURE 2 is a side elevation taken substantially on the line 2—2 of FIGURE 1, with parts in section and parts broken away.

In FIGURES 1 and 2 separate preliminary and final degassing tanks are illustrated. Referring to the figures, 10 indicates generally a pit containing a ladle-degassing tank 11 and a stream-degassing tank installation 12. A second elongated pit, which lies substantially at right angles to pit 10, is indicated at 13. As is apparent from FIGURE 2, the depth of pit 13 is somewhat less than that of pit 10. A third pit, which lies adjacent pit 10 on one side and pit 13 at one end, is indicated at 14. This pit is considerably shallower than pit 13 since it only receives a single run of a vacuum system, as will be explained in detail hereinafter. A divider wall is indicated at 15 and a fourth pit is indicated at 16. The fourth pit is approximately the same depth as pit 14 but it may be somewhat narrower, as seen best in FIGURE 1.

The preliminary or ladle-degassing unit 11 may advantageously be of the type described in my copending application, Serial No. 777,664, filed December 2, 1958, referred to hereinbefore. Briefly, in this type of installation, a stationary tank having a movable hood forms an airtight vacuum chamber capable of receiving a ladle of molten metal to be degassed. The tank is stationary and the cover is elevated and swung horizontally by a suitable lift-and-swing device. Since the specific ladle manipulating mechanism is not an essential feature of this invention, it is not further illustrated. In fact, the particular type of preliminary degassing unit utilized may be varied, and the illustrated ladle-degassing tank unit 11 is shown primarily for purposes of description.

The final or secondary degassing tank unit comprises essentially a stationary vacuum tank 20 supported by any suitable foundation, indicated at 21 in FIGURE 2. The joint between the lower end of upstanding tank wall 20 and foundation 21 will be welded or otherwise made gastight. An observation window is indicated at 22. The window and a suitable mirror mechanism may be utilized to observe the bottom of the tank during operation so that should there be any overflow or leakage of molten metal from the molten metal receptacle in the tank, it can be readily observed. An access door is indicated at 23. The door is located toward the corner of the pit. In the event of a run-out the frozen metal can be cut free through this access door. A conventional cooling water jacket may be formed integral with and surrounding the tank 20 to cool it during operation.

The upper end of tank 20 terminates in a tank flange 24. An intermediate section is indicated at 25. The intermediate section or transition piece consists of a wall portion 26 which, as shown best in FIGURE 2, takes the shape roughly of a lopsided frustrum of a cone. Wall 26 terminates, at its lower edge, in a sealing flange 27 which overlies sealing flange 24 at the upper end of tank 20. A suitable seal, not shown, is provided to form an airtight seal between the flanges. The upper edge of wall section 26 terminates in another sealing flange 28. A viewing port is indicated at 29. Standard lifting lugs and guides may be provided to lift the transition piece and properly align it when it is replaced on top of tank 20. Since the details of the lifting lugs and guides are not essential to an understanding of the invention, they are not further illustrated.

A ladle of molten metal is indicated at 30. The ladle may be of any suitable construction, such as the type illustrated in my aforementioned copending application. As best seen in FIGURE 1, the ladle includes a pair of lifting lugs 31, 32 and a stopper rod 33 offset from the vertical center of the ladle. This stopper rod closes a discharge opening through a suitable discharge member, in this case a nozzle 34. The nozzle may be of an alumina-type material and the nozzle bore may be on the order of about one inch. The ladle includes the conventional reinforcing ribs 35, 36. A sealing flange 37 encircles the ladle near its lower end. Sealing flange 37 mates with upper sealing flange 28 of the transition piece and the two flanges, when in engagement, form an airtight seal. When a ladle of molten metal with a stopper rod seated in the discharge nozzle 34 is placed on transition piece 25, a second or final degassing chamber is thus formed.

A conventional ingot mold is indicated generally at 40. The mold includes an ingot mold proper 41 which has a pair of lifting lugs 42, 43. Ingot mold proper 41 rests on a stool 44 and is securely attached thereto by links 45, 46 to connecting base lugs of 41 and the stool lugs to reduce danger of run-out. A hot top is indicated at 47.

As can best be seen in FIGURE 2, the center line of the ingot mold is aligned with the center line of the stopper rod and nozzle 34 so that molten metal passing downwardly from the ladle will be deposited evenly on the rising column of metal in ingot mold 40.

The degassing system for lowering the deleterious gas content of the molten steel until the steel approaches substantially vacuum arc remelt quality will next be described. The degassing system is particularly effective in lowering the oxygen content. It is generally considered that the number and severity of indigenous or native oxide inclusions are at least roughly proportional to the oxygen content in the steel.

The degassing system consists primarily of a multi-stage steam ejector vacuum pumping system. Ingot tank 20 is connected to the ejector system by a main conduit 50 and a large valve 51. The valve may advantageously be of the butterfly type and may, for example, be on the order of 42 inches. The valve opens into the first stage of the steam ejector which is indicated generally at 52. The stage consists essentially of a short length of uniform diameter piping 53 which opens into an inwardly tapering tube 54. Tube 54 terminates in a short uniform diameter length of pipe 55 which in turn opens into an outwardly expanding diameter length 56. The three lengths of pipe 54, 55 and 56 form in effect an ejector. A heater 57 surrounds the upper portion of the stage to prevent icing. A suitable connection 58 is provided to admit steam from any suitable source of the first stage. Since the details of the steam supply system are not essential to an understanding of the invention, it has not been further illustrated and described.

The last portion 56 of the first stage is connected by elbow 59 to another short conduit 60 which marks the beginning of the second stage. Second stage 61 consists of an inwardly tapering, a uniform diameter, and outwardly tapering pipes 62, 63 and 64, analogous to pipes 54, 55 and 56 of the first stage. Again, a heater 65 surrounds the upper portion of the stage. The second stage discharges into an elbow 66 which is connected by valve 67 to a straight run 68. A secondary conduit 69 opens into the ingot tank 20 and is connected by valve 70 and a short pipe 71 to straight runs 68. Valves 67 and 70 may advantageously be of the butterfly type and might, for example, be on the order of 30 inches. A cleanout is indicated at 72.

Run 68 is connected by T 73 to the third stage indicated generally at 74. The third stage again includes an inwardly tapering pipe, a short length of uniform diameter pipe and an expanding diameter pipe 75, 76, 77, respectively, analogous to the components of the previous two stages. Again a heater 78 surrounds the upper portion of the stage.

Ladle-degassing tank 11 is connected into T 73 by a short conduit 80 and another valve 81, which again may be of the butterfly type.

Third stage 74 is connected by elbow 82 to a plurality of additional stages. In order to effectively ladle degas the molten metal without utilizing stages 52 and 61, it is highly desirable to utilize four stages—three condensing and one noncondensing. Accordingly, three additional stages will be connected to elbow 82. Since their construction is quite similar to the three already described stages, they are not further shown and described in detail.

Figure 5:
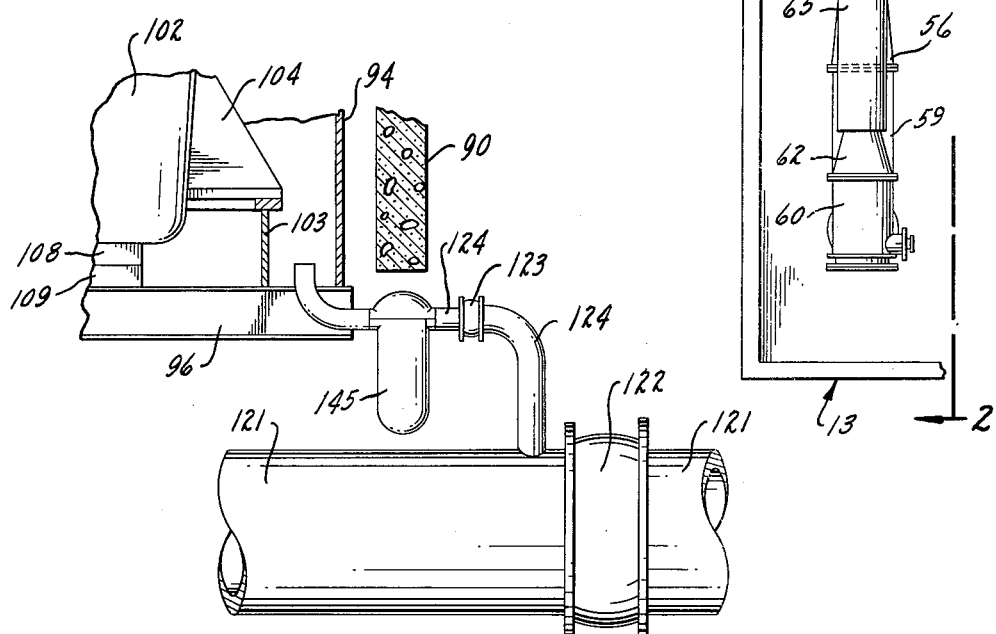
FIGURE 5 is a view taken substantially along the line 5—5 of FIGURE 3.

FIGURES 3 through 5 illustrate another embodiment of the invention. In this embodiment the ladle-degassing and ingot-degassing tanks are so positioned one to another that the ladle need not be physically moved between the completion of the ladle-degassing operation and the commencement of the stream-degassing operation.

Referring first to FIGURES 3 and 4, a ladle-degassing pit is indicated generally at 90 and the floor level at 91. Pit 90 is actually one deep hole extending from the floor level to the bottom 92. An intermediate wall 93 supports a vacuum tank 94 similar to vacuum tank unit 11 of FIGURES 1 and 2. As best seen in FIGURE 4, the vacuum tank 94 consists of a vertically oriented circular wall 95 welded to a suitable base 96. The upper end of wall 95 terminates in a sealing flange 97. The tank cover includes a shell 98 which terminates about its lower periphery in another sealing flange 99. Flange 99 is adapted to mate with flange 97 to form a gastight seal when the tank is in operation. A reflecting shield carried by the cover is indicated at 100. It will be understood that the showing is somewhat illustrative in that those portions of the tank exposed to the heat of the molten metal will in an actual setup be lined with a suitable refractory to protect the metal.

A ladle 102 rests upon a suitable support ring 103 by means of a plurality of supporting members 104 extending outwardly from the lower portion of the ladle. The ladle carries a stopper rod 105 which closes off discharge nozzle 106. Nozzle 106 in turn is aligned with a pouring sleeve 107 which directs the downwardly flowing metal into an ingot mold, to be later described. Ladle 102 carries a sealing ring 108 which, when placed upon a mating ring 109 carried by the supporting floor 96, forms an airtight seal between the bottom of the ladle and the floor. A purging gas may be bubbled upwardly through a bottom purging arrangement indicated generally at 101. For details of this purging arrangement reference is made to my copending application, above referred to, and copending application, Serial No. 54,745, filed September 8, 1960, and now abandoned.

With the parts in the position shown, it will thus be understood that a first vacuum chamber of a size sufficient to receive a ladle of molten steel to be degassed is formed which is separate from the second vacuum chamber to be described later. It should also be noted that the stopper rod 105 is arranged to be operated by remote control. Since the particular rod operating mechanism is not essential to an understanding of the invention, it is not further illustrated.

A second final degasing tank is indicated generally at 110. This tank extends from beneath the bottom of the ladle 102, which in effect forms a closure for the top of tank 110, down to the bottom of pit 90. The tank consists essentially of a steel shell 111 having a diameter sufficient to receive an ingot mold 112. A cooling water coil 113 is wrapped around the exterior of the tank to prevent overheating of the tank walls during a teeming operation. Tank wall 111 is welded gastight to a base 114 which rests on the pit floor 92. The ingot mold 112 in turn rests on a stool 115 within the teeming tank. A conventional hot top 116 is shown on top of the ingot mold 112. As can best be seen from FIGURE 4, the ingot mold is aligned with the discharge nozzle 106 and ladle 102 so that as molten metal is stream-degassed into the mold, there will be a uniform buildup of the ingot in the mold. A television camera is indicated at 117 in a suitable housing 118, opening into the lower tank 110. The behavior of the metal as it is streaming into the ingot mold can be observed by the camera from a remote location.

Each of the vacuum tanks is connected to a steam ejector, vacuum pumping system in a manner similar to the connection of the tanks of FIGURES 1 and 2. Lower tank 110 is connected to the first stage 120 of a steam ejector by a conduit 121 and a large valve 122. A by-pass valve 123 in a conduit 124 connects the interior of the ladle tank 94 to conduit 121 upstream from butterfly valve 122, as shown best in FIGURES 3 and 5. The first stage will not further be described in detail since it it can be similar to or, in fact, identical with the first stage described in connection with FIGURE 1.

First stage 120 in turn discharges into a second stage 125 which may be quite similar to the second stage of the embodiments of FIGURES 1 and 2.

Second stage 125 discharges into an elbow 126 which is connected by a butterfly valve 127, short conduit 128 and collar 129 to the third stage 130. The conduit, collar and third stage are enclosed in a shallow pit 131 similar to pit 14 described in connection with the embodiment of FIGURES 1 and 2. A cleanout door is indicated at 132.

The upper vacuum tank 94 is connected to the steam ejector system downstream from the second stage by a short conduit 135, a large butterfly valve 136 and a short connecting piece 137. A by-pass pipe 139, having another butterfly valve 140 therein, connects tank 94 to the steam ejector system around butterfly valve 136.

The third stage 130 may be connected to a fourth, fifth and sixth stage by elbow 141 in a manner analogous to the setup of the embodiment of FIGURES 1 and 2.

In FIGURE 5 the auxiliary connection of the degassing tank to the steam ejector system is illustrated in detail. A filter 145 is placed upstream from small butterfly valve 123 in pipe 124 for a purpose which will appear hereinafter.

The use and operation of the invention are as follows:

To produce an ingot of substantialy vacuum arc remelt quality steel in accordance with the method and apparatus of this invention approximately the following procedure is followed in connection with the embodiment of FIGURES 1 and 2.

A ladle of molten metal from an electric furnace, or any other suitable melting source, is placed in vacuum tank unit 11. The tank unit is closed to form an airtight chamber containing the ladle. Valves 67 and 70 in the steam ejector system are closed and valve 81 opened. Steam is then admitted to the ejectors and the molten metal is preliminarily degassed.

During this preliminary degassing stage, 74 is in effect a first stage and the three stages connected to elbow 82 are the second, third and fourth stages. Since the lowest vacuum reached may be no lower than 200 microns Hg, three stages will be condensing and one noncondensing. Actual experience has shown that the hydrogen, nitrogen and oxygen contents of the metal in the ladle 30 can be reduced to around 1–2 parts per million of hydrogen, 20–35 parts per million of nitrogen and 20–40 parts per million of oxygen.

The metal, when it is tapped from the furnace or melting source, may be in the neighborhood of 3,060 degrees F. A good many heats of 4340 and FX steel, among others, have been tapped around this temperature. For this type of steel the permissible temperature drop limitation is around 25 minutes. For purposes of this specification, and as used in the claim, the term "permissible temperature drop limitation" will be used to denote that length of time elapsing between the time that steel is tapped from the furnace until it is so cold as to be unsuitable for teeming into an ingot mold. The following tabulation of heats indicates the amount of time the steel may be degassed before the permissible temperature drop limitation is reached.

TABLE II

*Temperature drop limitation*

*8 heats—4340 and FX steel*

| Heat Number | Tap Temp., °F. | Teem Temp., °F. | Permissible Temp. Drop Limitation Total Elapsed Time Tap to Teem | Time Under Vacuum | Heat Size, Tons | Finish Vacuum, Microns |
|---|---|---|---|---|---|---|
| 103,526 | 3,160 | 2,885 | 32' 10" | 10' 26" | 40 | 170 |
| 113,765 | 3,125 ap | | 24' 18" | 9' 35" | 33 ap | 160 |
| 203,635 | 3,150 ap | 2,780 | 20' 48" | 17' ap | 33 | 150 |
| 213,711 | 3,175 ap | 2,865 | 25' 0" | 17' 28" | 33 ap | 175 |
| 213,712 | 3,200 ap | 2,865 | 26' 0" | 18' 46" | 33 ap | 180 |
| 213,735 | 3,200 ap | 2,800 | 24' 04" | 11' 05" | 32 | 195 |

In the following table degassing results obtained from degassing heats in accordance with the process set forth in my copending applications are tabulated. Each heat was of a size substantially equivalent to those set forth in Table II, was tapped and teemed at temperatures corresponding to those in Table II, was held under vacuum and had total elapsed tap to teem times approximating those given in Table II, and the finish vacuum was approximately as given in Table II.

TABLE III

*Degassing*

HYDROGEN RESULTS

| Steel | Heat | Before Tap | | | Ladle Degassed | | |
|---|---|---|---|---|---|---|---|
| | | $H_2$ | $N_2$ | $O_2$ | $H_2$ | $N_2$ | $O_2$ |
| 4340 | 203342 | [1] 3.0 | 35 | 95 | 1.2 | 23 | 20 |
| 4340 | 103417 | 3.5 | 50 | 110 | 1.2 | 21 | 28 |
| 4340 | 103765 | 3.1 | 29 | 78 | 1.2 | 24 | 26 |
| 4340 | 103767 | 3.8 | 28 | 47 | 1.2 | 26 | 34 |
| 4340 | 113815 | 3.3 | 30 | 82 | 1.2 | 36 | 28 |
| 4340 | 213733 | 3.8 | 23 | 94 | 1.2 | 27 | 32 |
| FX [2] | 213706 | | | | 1.0 | 13 | 22 |
| FX [2] | 203084 | 2.8 | 18 | 62 | 1.1 | 20 | 38 |

NITROGEN RESULTS

| 4340 | 203526 | 4.5 | 17 | 105 | 2.0 | 11 | 41 |
| 4340 | 103612 | | | | 1.8 | 11 | 42 |
| 4340 | 103652 | | | | 2.3 | 11 | 29 |
| 4340 | 103660 | | | | 2.5 | 11 | 33 |
| FX | 103675 | 7.0 | 32 | 82 | 2.6 | 4 | 34 |

OXYGEN RESULTS

| 4340 | 203342 | 3.0 | 35 | 95 | 1.2 | 23 | 20 |
| FX | 193077 | 4.3 | 59 | 118 | 1.6 | 37 | 10 |
| FX | 103718 | 4.4 | 54 | 94 | 1.2 | 22 | 19 |

[1] All gas contents in p.p.m.
[2] FX is a steel having nominal ranges of C .50–.60, Mn .65–.90, Si .20–.35, Ni .80–1.00, Cr .80–1.10, V .25–.35.

It will be understood that at the completion of this initial degassing the bulk of the included deleterious gases will have been removed. Although a good quality steel results, it will generally not meet the magnetic particle counts for vacuum arc remelt quality such as "Aeronautical Material Specification: AMS 2300" published by the Society of Automotive Engineers, 485 Lexington Avenue, New York 17, New York, as issued June 15, 1959.

It should also be observed that although the ladle vacuum purging system has been illustrated and described, any one of the other presently known commercial vacuum degassing methods, earlier mentioned, may be utilized. An important feature of my invention in one of its broader aspects is that the bulk of the included deleterious gases be removed in the preliminary degassing operation.

After the melt has been preliminarily degassed, butterfly valve 81 is closed and the vacuum in tank 11 broken. The vacuum tank cover is opened and the ladle placed on the transition piece 26 in the position shown in FIGURES 1 and 2. Butterfly valve 70 remains closed. Butterfly valves 67 and 51 are opened and as soon as a seal is made between flanges 37 and 28, the ejector system is again turned on, if it has been turned off during transfer. In order to remove the large quantity of gases in tank 20, stages 52 and 61 may not be immediately utilized because, as is well known, the weight of air which can be removed per unit time by an ejector system varies with the number of stages used and whether the stages are condensing or noncondensing. In any event, after the pressure in the system and vacuum tank 20 has fallen to a suitably low value, say on the order of about 300 microns Hg or below, steam is admitted to stages 52 and 61. These additional stages are sufficient to lower the vacuum in tank 20 to a value on the order of about 5 microns of mercury.

The necessity for a vacuum on the order of 5 microns can be seen from the following illustrative example using a 40,000 pound ingot.

EXAMPLE

| Element | Typical Included Gas Content in Ladle Degassed Steel, p.p.m. | Desired Content, p.p.m. | Removed, p.p.m. |
|---|---|---|---|
| O₂ | 35 | 10 | 15 |
| H₂ | 2 | 1 | 1 |
| N₂ | 25 | 20 | 5 |
| Total | | | 21 |

Assume one hour is required to stream a 40,000 pound ingot. In order to effectively remove 21 p.p.m. it will be necessary to utilize a vacuum system having a considerably higher capacity than what is theoretically needed. The higher capacity system is necessary to include other incalculable gas loads in the system. To compensate for these other factors it is convenient to base the calculation of the size of the vacuum system on a gas removal requirement of 2 to 3 times that actually needed. With a 40,000 pound ingot and a gas removal requirement of around 21 p.p.m., an estimated capacity of approximately 2½ times that theoretically needed or a removal of 50 p.p.m. may be assumed. The air equivalent of a 50 p.p.m. removal is calculated as follows:

$$\text{Gas load} = \frac{50 \text{ parts gas}}{1000000 \text{ parts steel}} \times 40000\# \text{ steel per hour}$$
$$= 2\# \text{ gas per hour}$$

For a required vaccum of 5 microns, Table I shows that last 6 stage ejector will handle the calculated gas load at the specified pressure.

When this system is in operation, stage 52 is the first stage, stage 61 is the second stage, stage 74 is the third stage, and the three stages connected to elbow 82 are, respectively, the fourth, fifth and sixth stages. In effect, there are provided two separate steam ejector systems, although when the larger stage system is in operation it is utilizing the entire "four" stage system used in the preliminary degassing.

As soon as a suitably low vaccum value is reached, say on the order of 10 microns of mercury, stopper rod 33 is actuated by any suitable mechanism and the moten metal is steam-degassed into ingot mold 40. The extremely low vacuum disperses the stream widely and the individual droplets, which are very small, are exposed to the very low vacuum which tends to draw out the nitrogen, hydrogen, and particularly oxygen which were not removed in the preliminary degassing.

Streaming into the ingot under high vacuum precludes contamination from the atmosphere.

In the system illustrated in FIGURES 3 through 5, the ladle need not be physically transferred to the second or final teeming tank after the preliminary degassing which thereby lengthens the time the metal may be preliminarily degassed.

This system has the additional advantage of being able to teem into the ingot mold at a lower pouring rate than in the setup of FIGURES 1 and 2. It will be understood that it is highly desirable for the teeming rate to be maintained as low as possible so that the ingot will build up slowly. Since at the start of the teeming operation the ladle is subjected to vacuum on the order of a fraction of a millimeter of mercury, as contrasted to the atmosphere existing in FIGURE 2, there is considerably less head on the metal at the nozzle. For a given size nozzle, the lower the head the lower will be the teeming rate.

This setup also has the additional advantage that the molten metal cannot pick up additional deleterious gases between the end of the preliminary degassing and the commencement of the final degassing because the ladle is never exposed to the atmosphere.

Finally, since there is no transfer of the ladle from tank to tank, there is no vacuum break and considerable time is saved which is an important factor when the temperature drop limitation of the steel undergoing treatment is low.

It must be borne in mind that the degassing process must be carried out without remelting the steel or without adding external heat to the process in order to make the process commercially feasible. The result is that the cycle must be extremely short. Essentially then, I have disclosed a method and apparatus for quickly removing the bulk of the gases at moderate vacuum and then further reducing these gases to lower levels, rapidly, at high vacuum. It is quite possible that the overall temperature drop may not be appreciably greater than the existing temperature drop, and of course far better results will be achieved. Since the second degassing operation includes a stream-degassing operation, the cycle time is not appreciably lengthened, the need for argon or other inert gas pouring is eliminated, and thus the permissible temperature drop limitation of the steel is not exceeded.

It would, of course, be possible to hold the molten metal under vacuum for an extremely long period of time. After the initial burst of gases is removed, only a very small percentage of gas will be removed per unit of time. Holding metal under a high vacuum for prolonged periods of time is not commercially feasible in the high production shop due to cost involved in length of time required and special equipment and refractories needed for prolonged exposure to high temperatures.

I claim:

In the process of forming vacuum arc remelt quality steel from molten, untreated steel within the permissible temperature drop limitation of the steel in a vacuum system having a variable capacity steam ejector gas removal system comprising a plurality of stages, at least the last stage of which is incapable of degassing the steel within said permissible temperature drop limitation, the steps comprising, forming a quantity of molten steel containing deleterious gases, subjecting the molten steel to a first vacuum level in the steam ejector system, said first vacuum level corresponding to the maximum number of stages in the steam ejector system having sufficient capacity to remove the bulk of the deleterious gases from the system, maintaining the steel exposed to the first vacuum level until the remaining gas load is within the capacity of the remaining stages of the steam ejector system, and subjecting the molten steel to a second, lower vacuum level in the same steam ejector system by stream degassing the partially degassed steel into a second vacuum environment, said second, lower vacuum level corresponding to the minimum number of stages of the same steam ejector system needed to remove sufficient gases to form vacuum arc remelt quality steel, the subjection of the steel to the second, lower vacuum level occurring for a period of time which, when added to the period of time the steel is subjected to the first vacuum level, is within the permissible temperature drop limitation of the steel.

(References on following page)

References Cited by the Examiner

UNITED STATES PATENTS

| | | |
|---|---|---|
| 1,554,368 | 9/25 | Rackoff et al. |
| 2,859,262 | 11/58 | Harders _____ 75—49 |
| 2,882,570 | 4/59 | Brennan _____ 75—49 X |
| 2,893,860 | 7/59 | Lorenz _____ 75—49 |
| 2,906,521 | 9/59 | Harders _____ 266—34 |
| 2,965,370 | 12/60 | Kesterton et al. _____ 266—34 |
| 2,994,602 | 8/61 | Matsuda _____ 75—49 |
| 3,128,324 | 4/64 | Spolders _____ 75—49 |

FOREIGN PATENTS

| | | |
|---|---|---|
| 683,996 | 3/30 | France. |
| 555,775 | 3/57 | Belgium. |
| 613,169 | 1/61 | Canada. |

OTHER REFERENCES

Electric Furnace Steel Proceedings, A.I.M.E., vol. 16, 1958, pp. 93–100.

DAVID L. RECK, *Primary Examiner.*

RAY K. WINDHAM, *Examiner.*